United States Patent Office 3,385,875
Patented May 28, 1968

3,385,875
PROCESS FOR ZINC THIOBENZOATE
Earl Kaplan, Metuchen, N.J., assignor to American Cyanamid Company, Stamford, Conn., a corporation of Maine
No Drawing. Filed June 15, 1964, Ser. No. 375,296
3 Claims. (Cl. 260—429.9)

ABSTRACT OF THE DISCLOSURE

An improved process for preparing zinc thiobenzoate which comprises reacting benzoyl chloride in aqueous medium with a soluble hydrosulfide, acidifying the resulting salt product until a controlled pH of between 4.0 and 6.5 is obtained, converting the acid to a soluble thiobenzoate by the addition of alkali at a controlled pH of between 10.5 and 13.5, and adding a soluble zinc salt to the soluble thiobenzoate to form the stable product, zinc thiobenzoate.

This invention relates to an improved method for making zinc thiobenzoate and to the resulting storage-stable product.

Zinc thiobenzoate is a good plasticizer for natural rubber. Prior to this invention, however, zinc thiobenzoate has not been commercially important, probably because of its well-known lack of storage stability.

Early mention of the use of zinc thiobenzoate in softening rubber is found in U.S. Patent No. 2,191,266, issued in 1940. A process for the preparation of zinc thiobenzoate is not given. However, it is now known that zinc thiobenzoate can be made by reacting sodium thiobenzoate with a zinc salt, the thiobenzoic acid used to form the sodium salt being obtained by reacting benzoyl chloride with sodium hydrosulfide. When this simple process is tried, it is found to have two major drawbacks. The isolation of the thiobenzoic acid from the reaction product of benzoyl chloride with sodium hydrosulfide, was accompanied by the formation of a malodorous, nauseating liquid which would offer severe difficulties in any large scale manufacture; and the final product, zinc thiobenzoate, decomposed on drying at 65° C.

It is an object of this invention to provide a process of making zinc thiobenzoate without the inconvenience of handling malodorous materials. It is a further object to provide a process for economically making a zinc thiobenzoate product which is stable in storage and retains its activity as a rubber plasticizer even after prolonged exposure to high temperatures.

These and other objects are accomplished in accordance with the present invention by a process comprising:

(1) Reaction of benzoyl chloride with an alkali metal or ammonium hydrosulfide, such as sodium hydrosulfide, to give an alkali metal or ammonium thiobenzoate.

(2) Acidification of the product of step (1) to a pH of 4.0 to 6.5 to give a solution of thiobenzoic acid, and filtration of said solution to remove precipitated impurities.

(3) Adjustment of the pH of the solution from Step (2) to between about 10.5 and 13.5.

(4) Reaction of the solution from Step (3) with a zinc salt to give zinc thiobenzoate, which is isolated.

By careful pH control during the formation of the thiobenzoic acid, and proper pH adjustment of the solution of sodium thiobenzoate prior to precipitation of the zinc salt, handling of malodorous oil is avoided and there is obtained a more stable product than was heretofore obtainable. The product is stable for 13 hours at 65° C. in vacuo, and for 30–60 days at 52° C. (125° F.).

The reaction between benzoyl chloride andسodium hydrosulfide is carried out in aqueous medium, preferably by adding the benzoyl chloride to a solution of sodium hydrosulfide in water. Two moles of sodium hydrosulfide are required per mole of benzoyl chloride. A slight excess (5–10%) over two moles is desirable. A reaction temperature of between 5° and 15° C. is recommended, although temperatures slightly above or below may be used. The reaction is continued until essentially completed as indicated by analysis for chloride ion (usually less than two hours).

The reaction mixture is then acidified to a pH of 4.0–6.5, preferably to a pH of 4.5–6.0. This effects the conversion of excess sodium hydrosulfide to hydrogen sulfide and expels any dissolved gases. Caution must be used during the addition of the acid. If the pH goes below 4, thiobenzoic acid will separate out as an oily, evil-smelling liquid. Any convenient acid capable of giving the desired pH may be used. The mineral acids, such as hydrochloric acid and sulfuric acid, are recommended. The solution of thiobenzoic acid is filtered to remove any iron sulfides, dibenzoyl sulfides or other insoluble material.

The pH of the solution is adjusted to between 10.5 and 13.5, preferably between 11.5 and 12.5, with an alkali, such as caustic soda, caustic potash or ammonia. The pH adjustment is critical for obtaining the stable zinc salt.

The solution of sodium, potassium or ammonium thiobenzoate is then added to an aqueous solution of zinc chloride, zinc sulfate or other soluble zinc salt in approximately equivalent proportions. A precipitate of zinc thiobenzoate is thereby formed. The order of addition may be reversed or both solutions may be added simultaneously to a third vessel. The precipitate of zinc thiobenzoate is filtered, washed with water and dried.

The process of the present invention offers the advantages over the prior art of eliminating the isolation and handling of thiobenzoic acid as a malodorous oil, and the production of zinc thiobenzoate of superior heat and storage stability.

For purposes of comparison, the amount of decomposition of zinc thiobenzoate products can be determined qualitatively by a change in color from light yellow or white to various shades of red, according to the following pattern.

TABLE I

| Color | Amount of Decomposition | Plasticizing Activity |
|---|---|---|
| White to light yellow | None | 100% |
| Moderate yellow to light orange | Slight | About 80%. |
| Light orange to medium orange | Considerable | About 50%. |
| Deep orange to red | Decomposed | Very little. |

The correlation between color and plasticizing activity was determined by the incorporation of the various samples of zinc thiobenzoate in natural rubber and measuring the Mooney viscosity by the standard method.

The following examples, in which parts are on a weight basis, are presented to further illustrate the present invention.

EXAMPLE 1

A suitable reaction vessel is charged with 2,550 parts of 36% aqueous solution of sodium hydrosulfide (920 parts of sodium hydrosulfide, 16.4 moles), 1,250 parts of ice and 2,550 parts of water. To this solution at 5° C., there is added 1,083 parts (7.75 moles) of benzoyl chloride over one-half hour while maintaining the temperature below 16° C. The reaction mixture is then stirred for 2.25 hours at 15–16° C. The pH of the solution is adjusted to approximately 5.0 by adding 108 parts of sulfuric acid as a dilute solution. Large amounts of hydrogen sulfide are evolved. After standing overnight, the solution of thiobenzoic acid is filtered to remove insoluble materials.

The pH of the solution is then adjusted to about 12.3 by the addition of caustic soda. This solution is then added over a 20-minute period to a suitable reaction vessel containing 1,049 parts of 50% zinc chloride solution (525 parts zinc chloride, 3.86 moles) and 1,500 parts of water. The suspension of precipitated zinc thiobenzoate has a pH of 5.8. The reaction mixture is divided into two equal portions, one portion adjusted to a pH of 6.2, and the other to a pH of 7.5 by the addition of caustic soda. The two precipitates are filtered off, washed with water and dried in air at room temperature. The total yield of zinc thiobenzoate is 91.4% of theory based on the benzoyl chloride. Both samples are stable at 125° F. for 62 days and at 65° C. in vacuo for 11 hours.

EXAMPLE 2

To a solution of 920 parts (16.4 moles) of sodium hydrosulfide (2,630 parts of a 34.95% aqueous solution) in 2,550 parts of water plus 1,250 parts of ice, there is added at a temperature between 10° and 18° C., 1,083 parts (7.75 moles) of benzoyl chloride. The reaction mixture is stirred for three hours at 10–18° C., followed by a pH adjustment to between 5 and 6, using dilute sulfuric acid. The solution is stirred for about one hour until most of the hydrogen sulfide has been evolved. The resulting solution of thiobenzoic acid is then divided into six equal parts.

The pH of each portion of the solution is adjusted to a definite value by the addition of caustic soda. Each portion of solution is then added over about 15 minutes to a mixture of 210 parts of 46.5% zinc chloride solution (10% excess of zinc chloride) and 150 parts of water. The precipitated zinc thiobenzoate is then separated by filtration, washed with water and dried in air at room temperature. The pH's of the solutions of sodium thiobenzoate and the stabilities of the resulting lots of zinc thiobenzoate are shown in Table II.

TABLE II

| pH of sodium thiobenzoate solution: | Stability after 16 hours at 65° C. at atm. pressure |
|---|---|
| 7 | Decomposed. |
| 9 | Do. |
| 10 | Do. |
| 11 | Slight decomposition. |
| 12 | Very slight decomposition. |
| 13 | No decomposition. |

These results show that increased stability of the product is obtained when the solution of sodium thiobenzoate has a pH of at least 11, and, preferably, 12 or above.

EXAMPLE 3

When the procedure of Example 1 is repeated, using potassium hydroxide or aqueous ammonia to adjust the pH of the sodium thiobenzoate solution to a value between 12 and 13, essentially the same results are obtained.

EXAMPLE 4

Zinc thiobenzoate is prepared by the general procedure of Example 1 with the pH of the thiobenzoic acid solution adjusted to 13.2. Portions of the product are stored for 21 days at room temperature, 100° F. and 125° F.

The plasticizing activities of the stored products and of a similarly stored commercial plasticizer (a commercial form of zinc thiobenzoate) are measured on samples of natural rubber compounded on an open rubber mill at 100° C. using 0.25% of zinc thiobenzoate based on the weight of the rubber and a milling time of ten minutes. The Mooney Viscosity ML–4 at 100° C. was measured on each sample of compounded rubber.

TABLE III

| | Mooney Viscosity ML–4 after 21 days at— | | |
|---|---|---|---|
| | Room Temp. | 100° F. | 125° F. |
| Product of Example 1 | 30.5 | 26.0 | 38.0 |
| Commercial Plasticizer | 31.0 | 30.0 | 52.0 |
| No plasticizing agent | | 82.0 | |

These results show that the product of Example 1 has about 90% of its original activity after 21 days at 125° F., while the commercial plasticizer has only about 60% of its original activity.

I claim:
1. In the process for preparing zinc thiobenzoate whereby (a) mole benzoyl chloride is reacted in aqueous medium with about two moles of a soluble hydrosulfide, and (b) the resulting salt of thiobenzoic acid is reacted in aqueous medium with a soluble zinc salt, the improvement comprising the following steps:
   (1) acidifying the reaction product of benzoyl chloride and hydrosulfide until a pH of between 4.0 and 6.5 is obtained, thus producing a single phase thiobenzoic acid solution;
   (2) filtering insoluble materials from the acidified product of Step (1);
   (3) adding an alkali to the filtrate from Step (2) until a pH of between 10.5 and 13.5 is obtained; and
   (4) mixing the solution from Step (3) with an aqueous solution of a soluble zinc salt.
2. The process of claim 1 wherein the pH in Step (3) is between 11.5 and 12.5.
3. The process of claim 1 wherein the pH in Step (1) is between 4.5 and 6.0.

References Cited

UNITED STATES PATENTS

| 2,191,266 | 2/1940 | Williams et al. | 260—500 X |
| 2,195,198 | 3/1940 | Balle | 260—515 |
| 2,480,823 | 9/1949 | Morris et al. | 260—429.9 X |

OTHER REFERENCES

Chemical Abstracts, vol. 54, page 10368g (1960).

TOBIAS E. LEVOW, *Primary Examiner.*

H. M. S. SNEED, *Assistant Examiner.*